United States Patent
Daley

(10) Patent No.: US 7,711,259 B2
(45) Date of Patent: May 4, 2010

(54) METHOD AND APPARATUS FOR INCREASING DEPTH OF FIELD FOR AN IMAGER

(75) Inventor: Jon Daley, Boise, ID (US)

(73) Assignee: Aptina Imaging Corporation, Grand Cayman (KY)

( * ) Notice: Subject to any disclaimer, the term of this patent is extended or adjusted under 35 U.S.C. 154(b) by 880 days.

(21) Appl. No.: 11/486,069

(22) Filed: Jul. 14, 2006

(65) Prior Publication Data

US 2008/0013941 A1    Jan. 17, 2008

(51) Int. Cl.
*G03B 13/36* (2006.01)
(52) U.S. Cl. ...................................... 396/89
(58) Field of Classification Search .................. 396/89, 396/133; 348/345
See application file for complete search history.

(56) References Cited

U.S. PATENT DOCUMENTS

| | | | | |
|---|---|---|---|---|
| 5,307,170 A | * | 4/1994 | Itsumi et al. | 348/219.1 |
| 5,838,374 A | * | 11/1998 | Kikuchi | 348/351 |
| 6,005,974 A | | 12/1999 | Kochi et al. | |
| 6,320,979 B1 | * | 11/2001 | Melen | 382/154 |
| 2001/0013895 A1 | | 8/2001 | Azawa et al. | |
| 2002/0122132 A1 | * | 9/2002 | Ohki | 348/345 |
| 2005/0146633 A1 | * | 7/2005 | Kuo et al. | 348/345 |

FOREIGN PATENT DOCUMENTS

DE    10 2004 007 608 A1    8/2005

* cited by examiner

*Primary Examiner*—W. B. Perkey
(74) *Attorney, Agent, or Firm*—Dickstein Shapiro LLP

(57) ABSTRACT

An imaging method and apparatus is disclosed which improves the depth of field of an image by, in one exemplary embodiment, capturing a plurality of images at respective different focus positions, and combines the images into one image and sharpens the one image. In an alternative exemplary embodiment, a single image is captured while the focus positions change during image capture, and the resulting image is sharpened.

33 Claims, 12 Drawing Sheets

METHOD AND APPARATUS FOR INCREASING DEPTH OF FIELD FOR AN IMAGER

FIELD OF THE INVENTION

The invention relates to a method and apparatus for increasing the depth of field for an imaging device, for example a camera.

BACKGROUND OF THE INVENTION

In imaging devices, e.g., cameras, there is often a need for a large depth of field. Depth of field is the portion of an image which is "in focus" on either side of an in focus focal point in the image. Objects outside of the depth of field will appear blurry.

Referring to FIG. 1, a digital imager 100, e.g., a digital camera, having a conventional fixed focus lens system is shown in a cross-sectional view. The imager 100 includes a sensor module 170, formed over a substrate 180, which comprises an image sensor 150 having a pixel array and being formed over an attachment layer 160. FIG. 1 schematically shows a fixed focus lens 130 mounted in lens mount 120 in a fixed position over module 170. Incoming light 110 is focused by fixed focus lens 130 onto image sensor 150.

The conventional fixed focus lens 130, shown in FIG. 1, has a fixed position relative to sensor module 170 and is designed such that objects which are at a predetermined distance in front of the lens are in focus. There is a fixed focal length (f0) from lens 130 to focal point 140, where f0 is the distance from L1 to L2, which correspond to the positions of lens 130 and focal point 140. There is a limit on the distance from the lens 130 (or focal point 140) at which objects are in focus. For example, objects that are either nearer or farther from a predetermined in-focus distance from the lens 130 will not be in focus.

Referring to FIG. 2, a conventional manually or automatically focus adjustable lens digital imager system 200, e.g., a digital camera, is shown in a cross-sectional view. The system 200 includes an adjustable focus lens 230 and a sensor module 270 formed over substrate 280. The system 200 additionally includes image sensor 250 having a pixel array formed over an attachment layer 260. Incoming light 210 is focused by lens 230 into the image sensor 250. Adjusting the position of the lens relative to the image sensor 250, changes the in focus distance from an object in an image to lens 230. Thus, the focal length f1 may be changed when lens 230 is adjusted to bring a desired object within an image into focus. However, whatever focal position is used to focus on an object, there is still a limited depth of field associated with the focus position.

In sophisticated cameras having a variable aperture, depth of field can be increased somewhat by using smaller apertures which pass lens light. This reduces the brightness of the overall image seen by a sensor and also requires longer image capture times.

In many instances, it would be desirable to increase the depth of field without aperture adjustments, or other complicated procedures.

BRIEF DESCRIPTION OF THE DRAWINGS

The advantages and features of the invention will become more apparent from the detailed description of exemplary embodiments provided below with reference to the accompanying drawings in which.

DETAILED DESCRIPTION OF THE INVENTION

In the following detailed description, reference is made to various specific embodiments in which the invention may be practiced. These embodiments are described with sufficient detail to enable those skilled in the art to practice the invention, and it is to be understood that other embodiments may be employed, and that structural and logical changes may be made without departing from the spirit or scope of the invention.

An imager, e.g., digital camera, constructed in accordance with the invention improves the depth of field of an image by taking multiple exposures (step 302) of an image taken at different relative focus positions. The multiple exposures are then combined to form a single, final image (step 303). It should be appreciated that a camera can be initially focused, either manually or by autofocus on a desired object in the camera view, before the taking of the multiple images (step 301).

In one embodiment of the invention, N discrete images are captured in equal or non-equal focus spacings along the optical axis with the spacings centered or non-centered about the user or autofocus selected initial focus position. The number N, and the spacing amount and the center of the spacings may be chosen by the end user, or be part of a default camera setting. The captured images are then combined on a pixel-by-pixel basis with either equal or unequal weighting for each image.

For example, for the pixel in the ith row and jth column, a combined image by using equal weighing for each captured image is formed as follows:

$$\text{Combined}(i,j) = \Sigma((1/N) * \text{Image} N(i,j)), \quad (1)$$

where ImageN(i,j) represents N images captured at N different focus positions. A combined image by using unequal weighing is formed as follows:

$$\text{Combined}(i,j) = a1 * \text{Image1}(i,j) + a2 * \text{Image2}(i,j) + \ldots + aN * \text{Image}N(i,j), \quad (2)$$

where a1, a2, etc. represent weighting factors for the respective images and Image1, Image2, etc. represent the images captured at the different focus positions. An image sharpening process may then be applied to the combined image at step 304 to produce the final image with increased depth of field which can be output at step 305.

Figure 1:
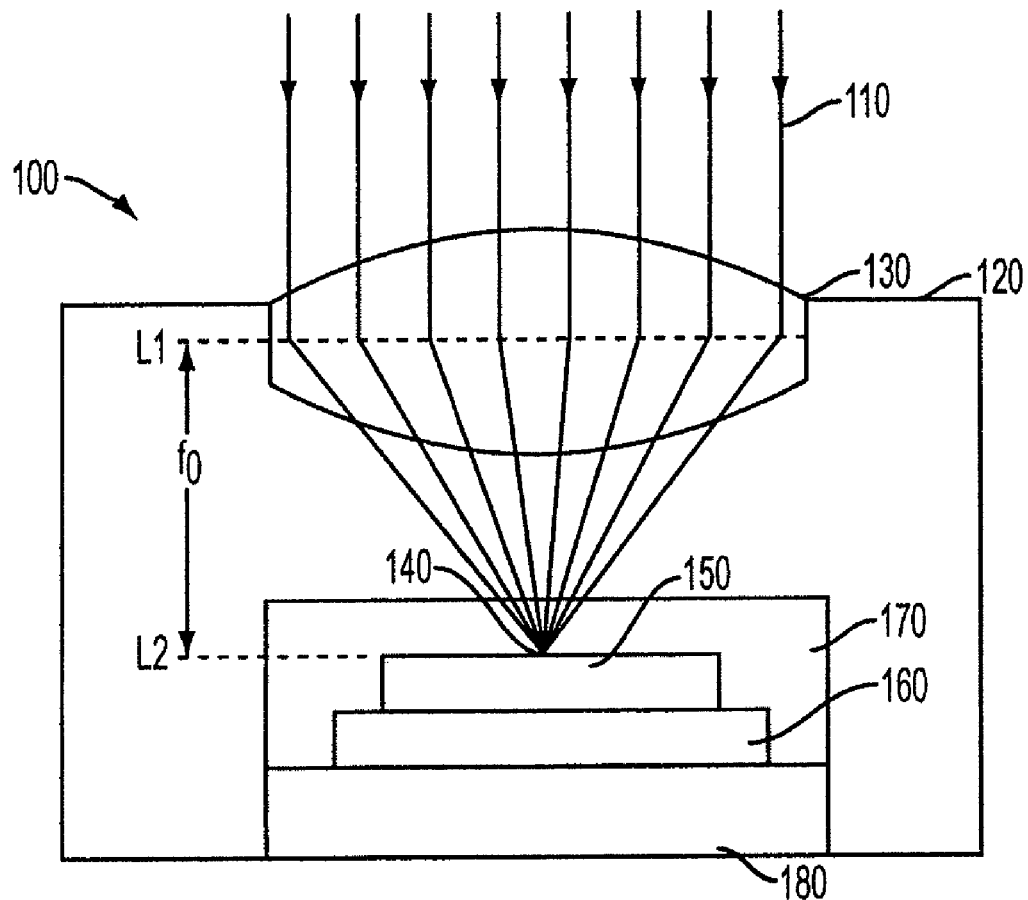
FIG. 1 is an illustration of a cross-sectional view of a conventional fixed focus lens system.
Figure 2:
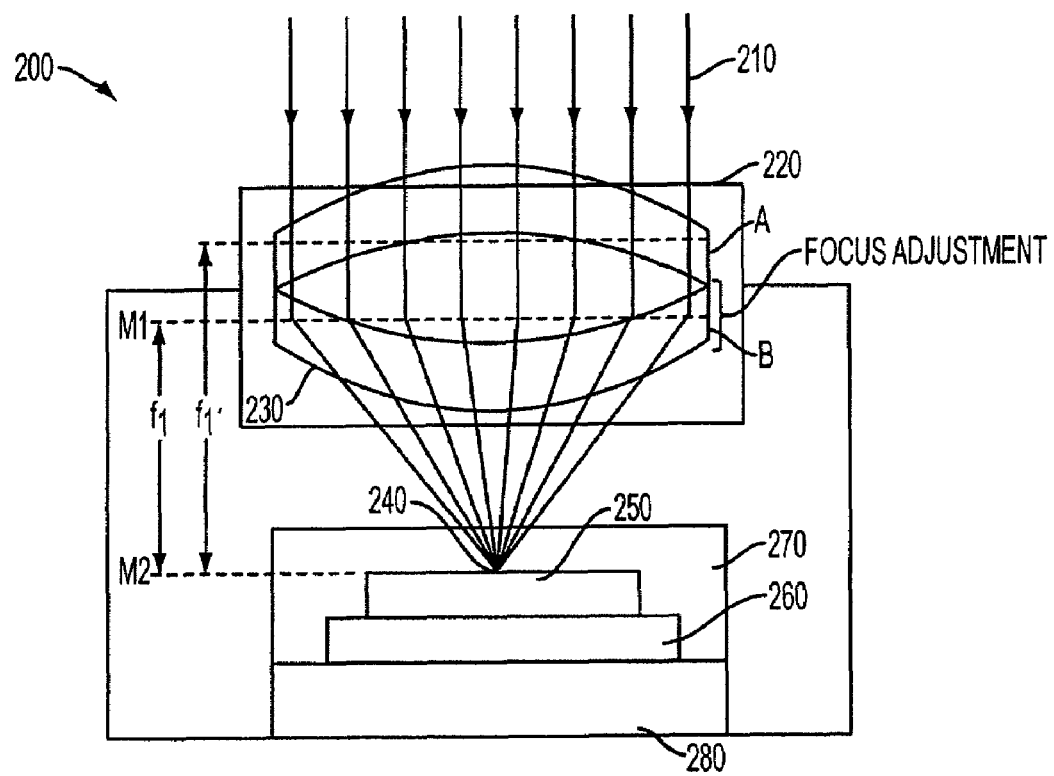
FIG. 2 is an illustration of a cross-sectional view of a conventional adjustable focus lens system.
Figure 3A:
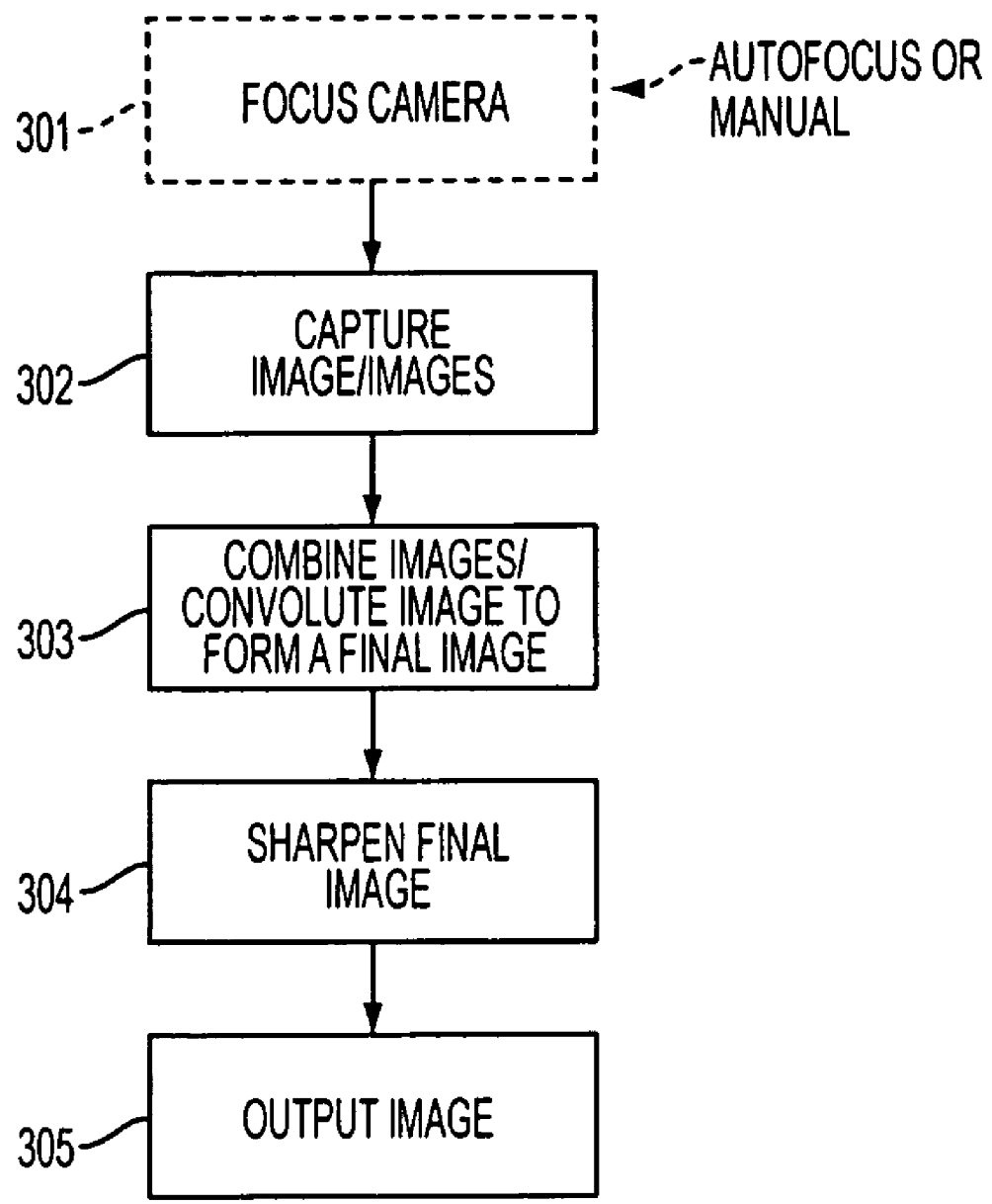
FIG. 3A is a flowchart of an increase depth of field operation in accordance with an embodiment of the invention.

In one particular example of the invention, which is illustrated in the process flow of FIG. 3A, three discrete images (N=3) are captured in step 302 along the optical axis at: 1) best focus, which may be user selected or selected by an autofocus mechanism, 2) best focus +d, and 3) best focus −d (d is a distance either chosen by the user, or set in a default camera setting). The three images are then combined in step 303 on a pixel-by-pixel basis with either equal or unequal weighting for each image, again as set by a user or as a default setting. When three discrete images are captured, for the pixel in an ith row and jth column of a pixel array, a combined pixel signal using equal weighing can be formed as follows:

$$\text{Combined}(i,j) = (1/3) * \text{BestFocus}(i,j) + (1/3) * \text{BFplus}(i,j) + (1/3) * \text{BFminus}(i,j), \quad (3)$$

where BestFocus(i,j) is a focus position set by a user through manual or autofocus, BFplus(i,j) is a focus position behind that set by a user, and BFminus(i,j) is a focus position in front of that set by a user. A combined pixel signal from different images using unequal weighing may be formed as follows:

$$\text{Combined}(i,j) = (1/2) * \text{BestFocus}(i,j) + (1/4) * \text{BFplus}(i,j) + (1/4) * \text{BFminus}(i,j) \quad (4)$$

In this case more weight is given to the image captured at the initial set focus position which is set manually or by autofocus. An image sharpening process may also be applied in step 304 to the combined image to produce the final image having an increased depth of field over that of an image captured at a single focus position.

Figure 3B:
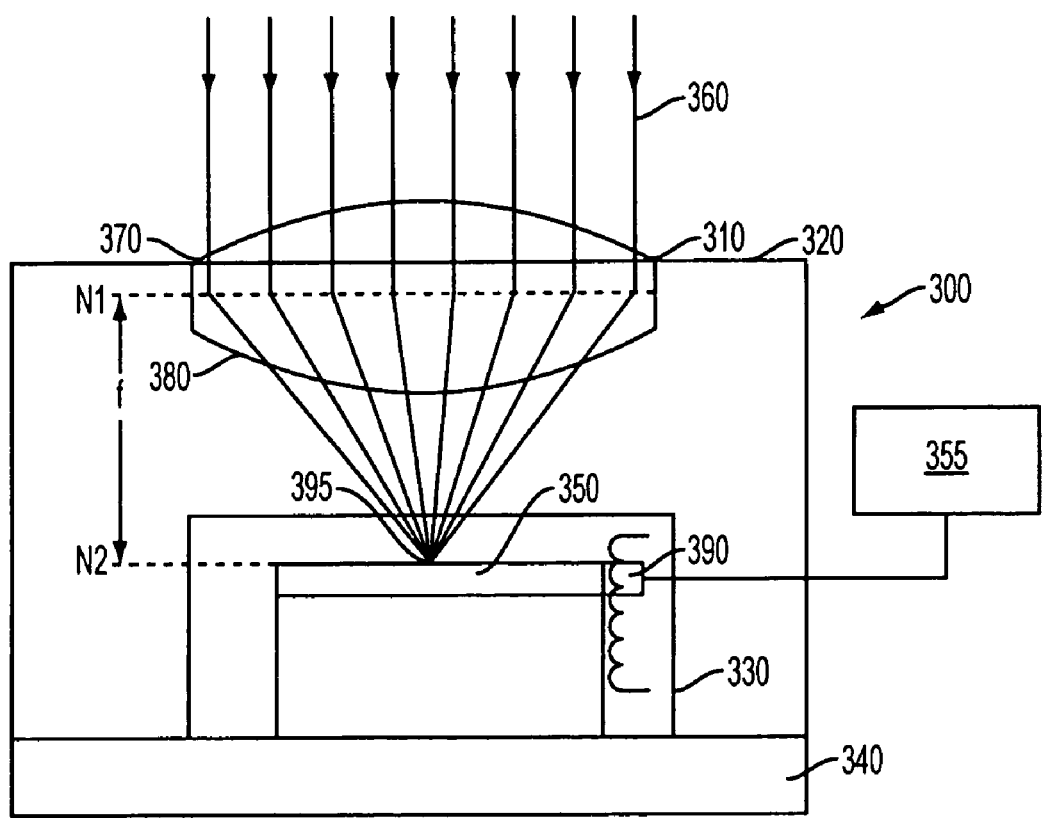
FIG. 3B is an illustration of a cross-sectional view of a focus lens assembly in accordance with the embodiment of the invention.

FIG. 3B illustrates one exemplary way to implement the focus changes during the multiple image capture step 302 of FIG. 3A. FIG. 3B is a cross-sectional view of an image sensor having a lens assembly 300 comprising a lens 310 mounted in lens mount 320 above a sensor module 330. Sensor module 330 is formed over a housing base 340. An image sensor 350, which includes a pixel array, is mounted within sensor module 330. An adjusting mechanism 390 is mounted to image sensor 350 and controls the position of the image sensor 350 relative to lens 310 along the optical axis. The adjusting mechanism 390 receives a signal from a controller 355 that is programmed to move the image sensor 350 incrementally to capture the multiple images which are combined in step 303 of FIG. 3A. It should be appreciated that the adjusting mechanism 390 can instead be mounted to the lens 310, and control the position of the lens 310 relative to a fixed image sensor 350. Focal length (f) is the distance from lens 310 to focal point 395, or the distance from N1 to N2, which correspond to the relative positions of lens 320 and focal point 395. Focal length f may change (increased or decreased), as image sensor 350 is adjusted manually or automatically to first focus on an object in an image which is captured and then to automatically change the focus position to capture multiple images in step 302 which are combined in step 303 to increase the depth of field.

Figure 3C:
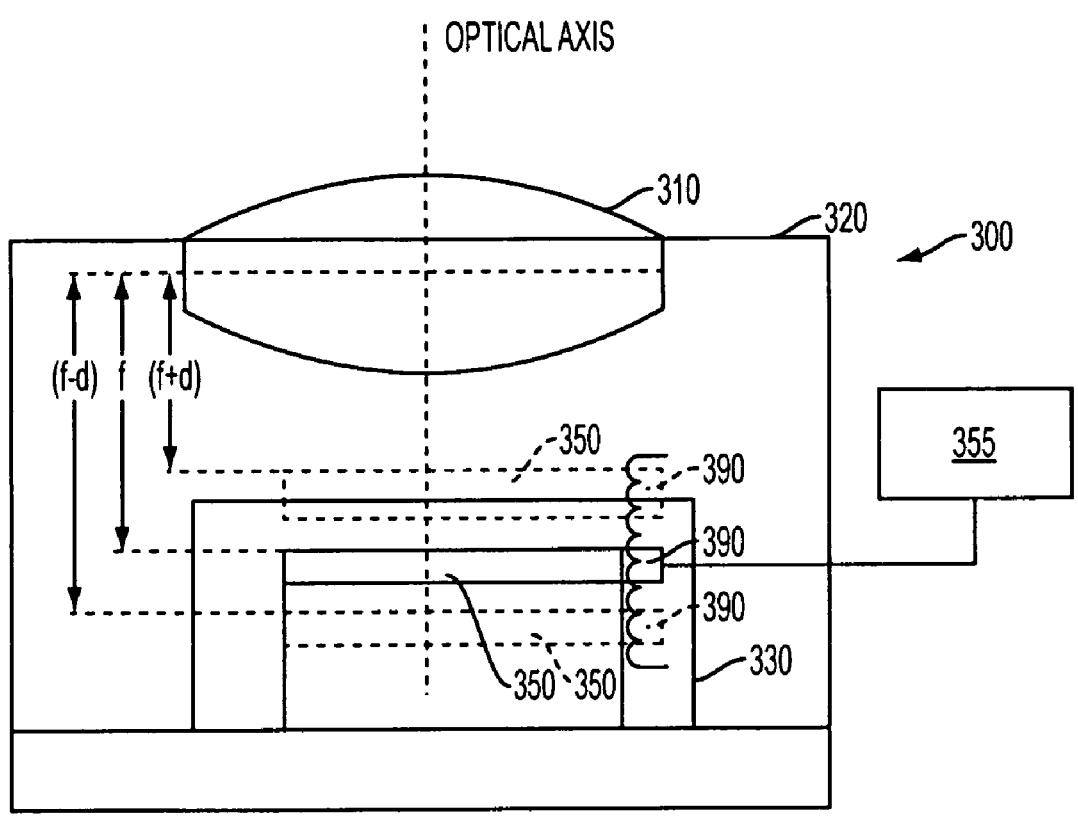
FIG. 3C is another illustration of a cross-sectional view of a focus lens assembly in accordance with the embodiment of the invention.

FIG. 3C shows how the adjusting mechanism 390 of FIG. 3B moves the image sensor 350 a distance +/−d through the initially selected (optimum) focus position f (i.e., from f−d to f+d) along the optical axis during image exposure. The adjusting mechanism 390 receives a signal to execute the automatic adjustment of the focus position for capture of each of the images discussed above in relation to FIG. 3A. It should also be appreciated that the adjusting mechanism 390 can automatically move the lens 310 during the exposure (i.e., from f−d to f+d) or for a fixed camera, the user can manually move the lens 310 as desired. In other embodiments of the invention, image sensor 350 may be operably mounted within sensor module 330 to any other material, device or mechanism, which can change a relative position of the image sensor 350 and lens 310 to change the focus position for each of the captured images. The adjusting mechanism 390 may be in the image sensor 350 itself or it may be a separate component.

Image sensor 350 may be any solid state image sensor, for example, a CMOS image sensor comprising a focal plane array of pixel cells, each one of the cells including either a photogate, photoconductor, or photodiode for accumulating photo-generated charge.

Figure 3D:
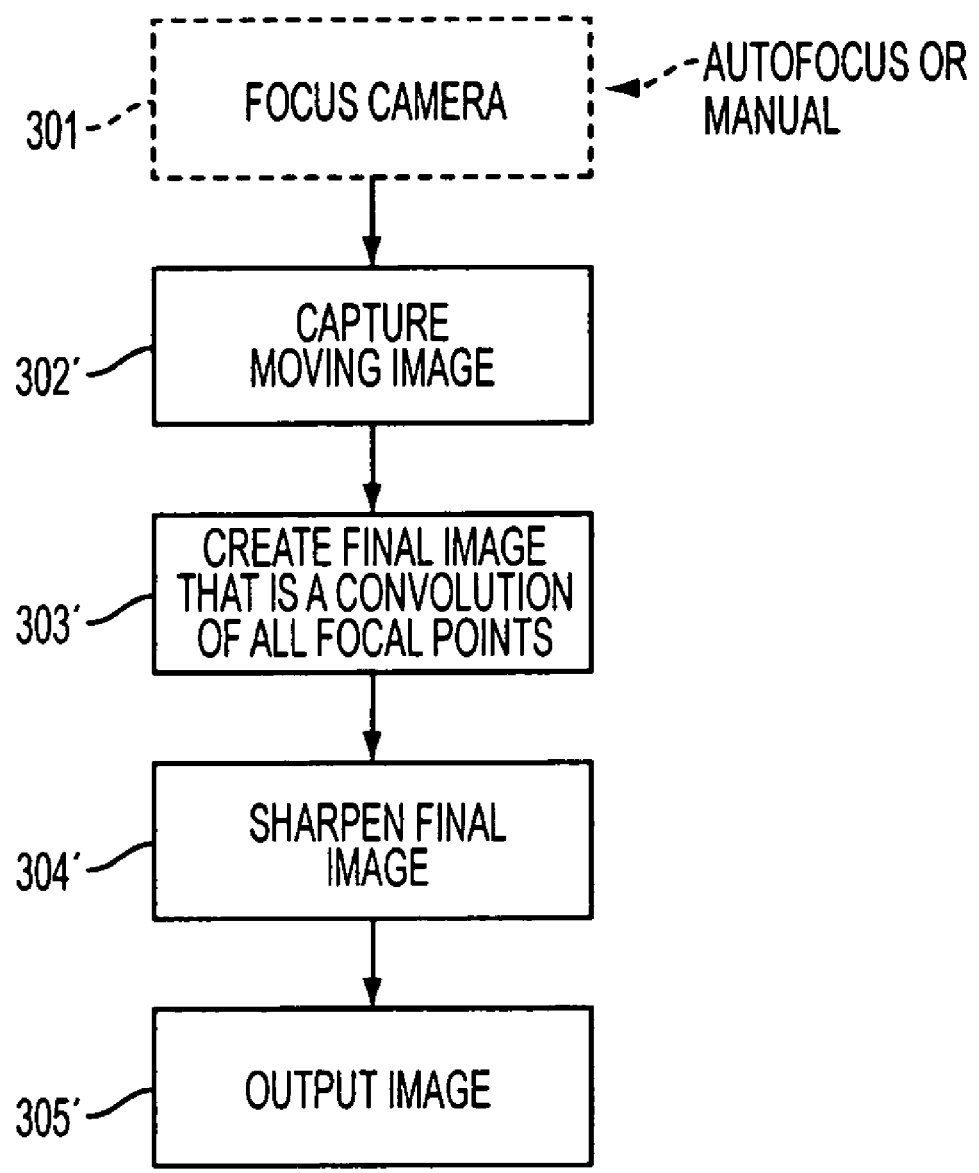
FIG. 3D is an illustration of a cross-sectional view of a focus lens assembly in accordance with another embodiment of the invention.

In another embodiment of the invention, shown in FIG. 3D, only one image is captured, but the image is captured with the focus position changing during image capture, by moving the image sensor 350 or lens 310, at a constant speed along the optical axis (from best focus−d to best focus+d) (step 302'). The pixels will collect light during this entire time of image capture, creating an image that is a convolution of all focus positions passed through by the imager (step 303'). Due to the constant speed of the imager, all points will inherently receive equal weighting. The speed, starting, and stopping points may be user adjustable or set as camera default parameters. An image sharpening process, step 304', may then be applied to the image to produce the final image with an increased depth of field which may be output at step 305'.

In another embodiment, similar to the previous embodiment, the velocity may vary by position following a profile set by the end user, or set as a default profile within the camera, or a combination of a default profile with some user customization. One example of such a profile is:

$$\text{Velocity} = a + bX + cX^2 \text{(with X imaging from −d to best focus to +d) on a parabolic curve.}$$

where a, b, c and d are camera default or user settable parameters, and X is the position of the image sensor relative to the user/autofocus selected best focus (with best focus being X=0).

The relative time spent at any location will be proportional to 1/V where V is the velocity of the imager at that point along the optical axis. The relative weight given to a small region r along the optical axis will therefore be 1/V. An image sharpening process is also applied to the acquired image to produce a final image with increased depth of field.

For all embodiments, the image sharpening technique can be chosen for any optimum speed and quality. For example, an UnSharp Mask Algorithm, such as employed in PhotoShop® or other image processing applications, can be used. The UnSharp Mask algorithm is a known method for sharpening digital images. The sharpening algorithm may also be tailored to each of the embodiments described above. The image sharpening technique is fast, taking only a few seconds for even large images.

Any manual or autofocus techniques known in the art can be used to set the initial "best" focus position for any of the described embodiments of the invention.

Figure 3E:
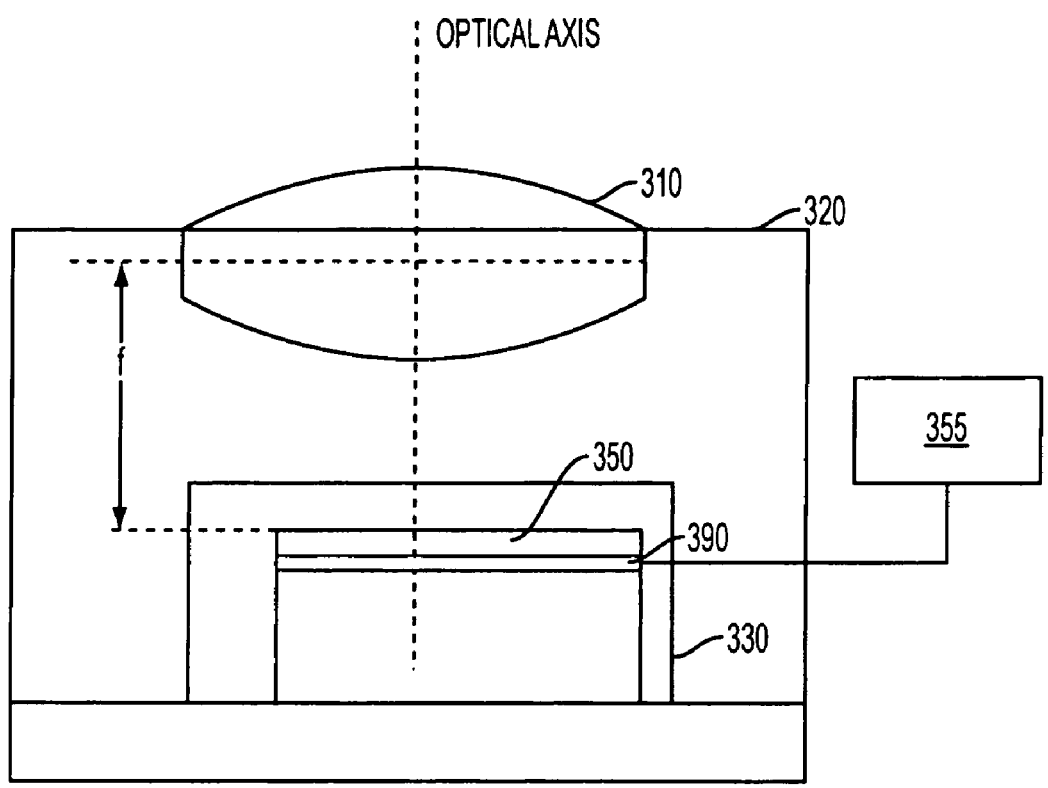
FIG. 3E is an illustration of a cross-sectional view of a focus lens assembly in accordance with another embodiment of the invention.

The movement of the image sensor or lens may be accomplished with a piezoelectric actuator as the adjusting mechanism 390, as shown in FIG. 3E, which can be mounted to the back portion of the image sensor 350 to be moved. A control circuit in a system-on-chip (SOC) imager module or in a companion chip will calculate and apply the appropriate voltage to move the image sensor to the correct position during image capture. Alternatively, a mechanical system can be used as actuator 390 where a small servo or micro-motor can drive the image sensor 350 to the desired location.

The entire system could also be set up such that the lens is moved or swept through the focus positions during the exposure rather than the image sensor. This would result in a simpler and less expensive imager, and requires that the control circuitry in the imager control lens position.

Figure 4:
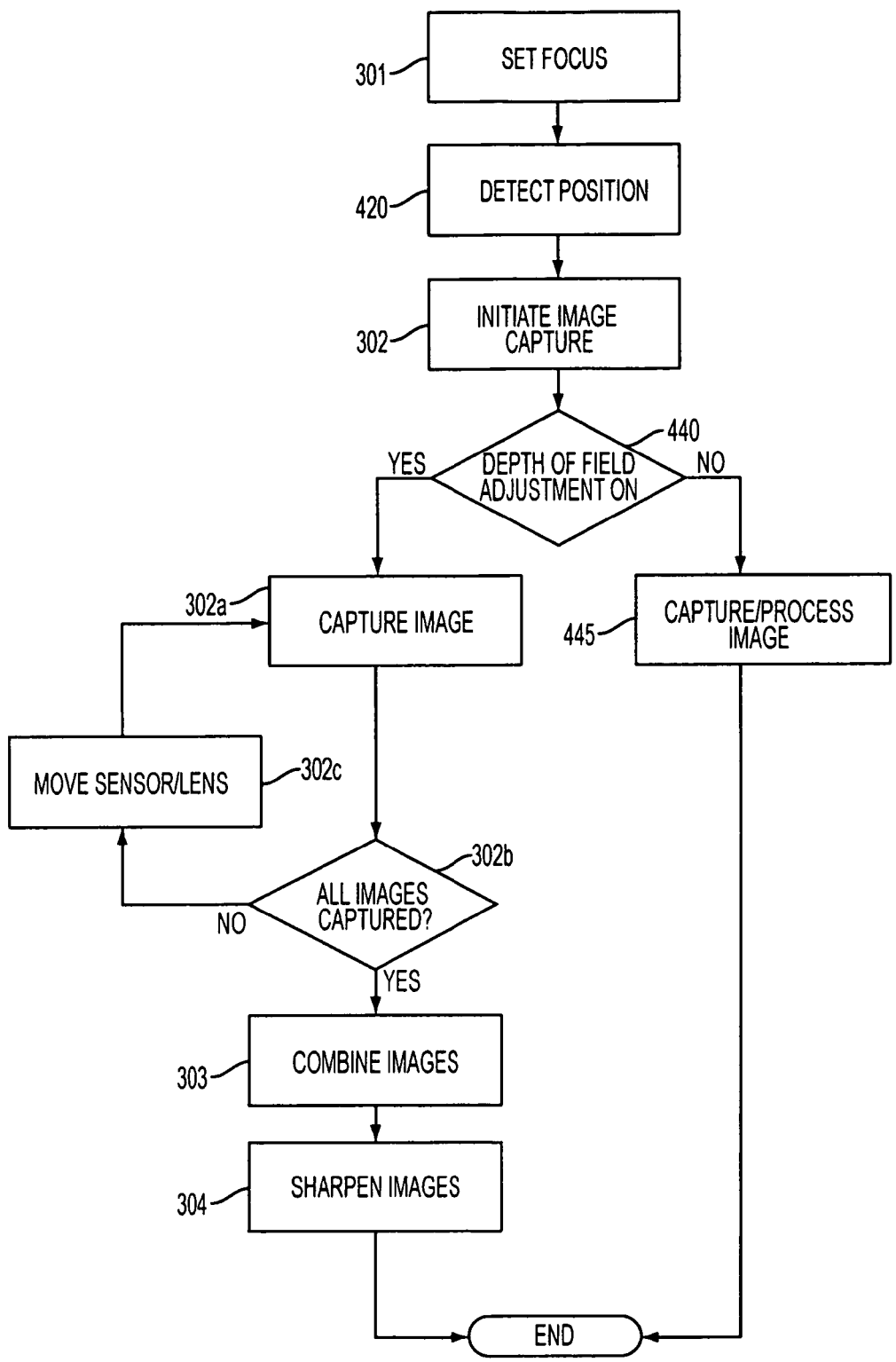
FIG. 4 is a flowchart of an increase depth of field operation in accordance with an exemplary embodiment of the invention.

The increased depth of field function may be tuned on or off at will or under control of the camera when predetermined criteria are met. FIG. 4 is a flowchart showing uses of the invention as part of an overall image capture process used in an imaging apparatus such as a digital camera and using multiple image capture to increase the depth of field. As shown in FIG. 4, a user or autofocus operation sets the initial focus position of an image sensor/lens (step 301). The relative initial position of the image sensor/lens is then detected and stored in a memory storage device. The image sensor, e.g., image sensor 350, may be a component of any imaging apparatus, such as a CMOS, CCD camera or other imaging apparatus. Information on the relative focus positions of the lens and image sensor 350 may be used for other camera functions in addition to being used in the implementation of the invention. Once the image sensor/lens position is detected in step 420, an image capture is initiated in step 302.

At step 440, it is determined if the depth of field adjustment feature is on. If not, an image is captured and processed in step 445 without employing a depth of field adjustment. Image processing may be performed according to any known image processing techniques. For example, image processing may comprise sampling of pixels in an image array according to one or more criteria, such as color processing, white balancing, or other criteria. If the depth of field adjustment is on, an image is captured at step 302a at the initial focus position of the lens and image sensor 350 as set in step 301. After a first image is captured at step 302a, the process proceeds to step 302b where it is determined whether all of the multiple images have been captured. If not, a new focus position of the image sensor/lens is set in step 302c and another image is captured in step 302a. It should be appreciated that steps 302a, 302b and 302c are repeated until the desired number of images used for depth of field adjustment is obtained. Once the desired number of images are captured as determined in step 302b, the captured images are combined in step 303 to form a final image and the resulting final image is sharpened in step 304.

Figure 5:
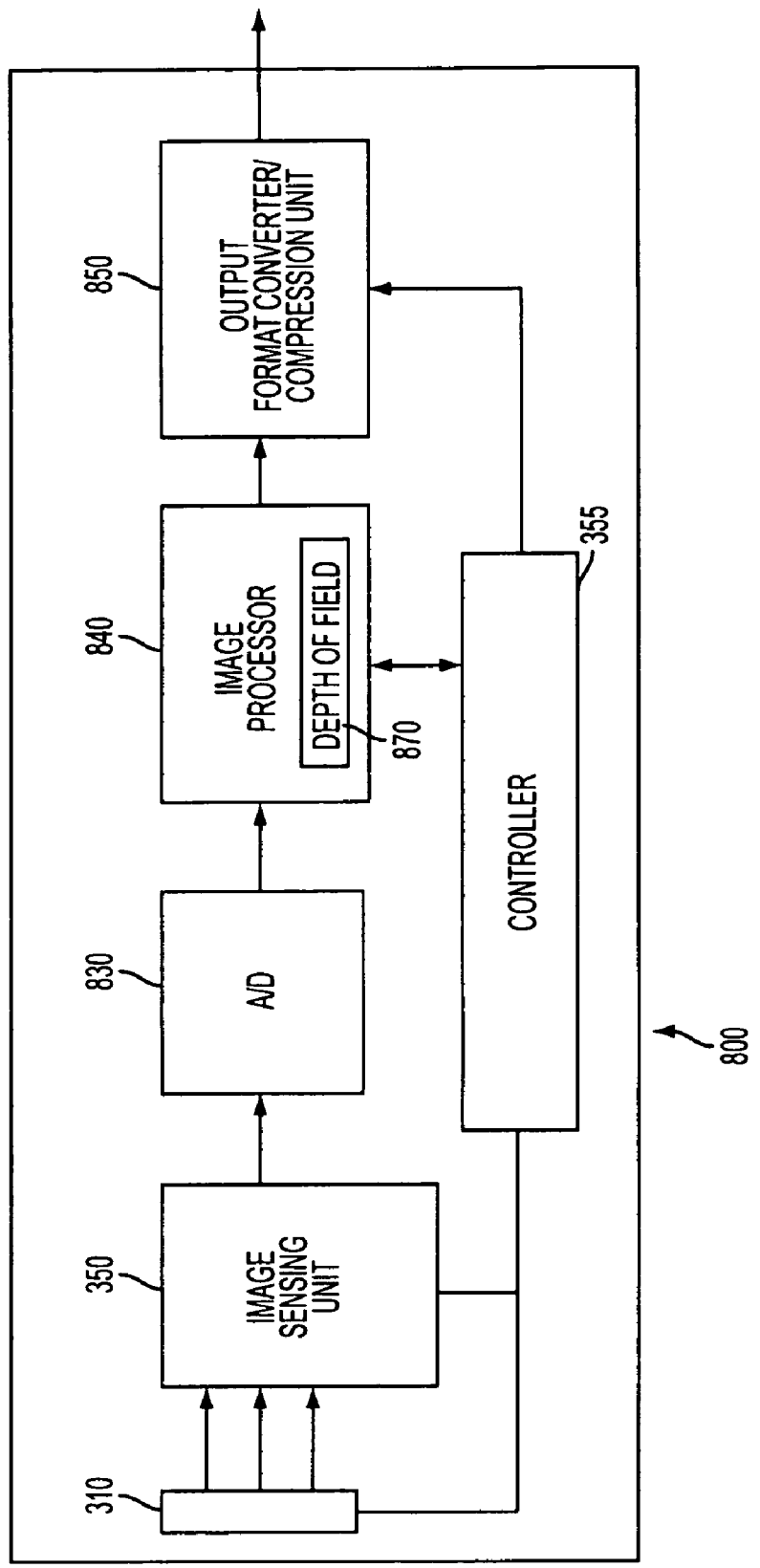
FIG. 5 is a block diagram of an imaging apparatus in accordance with one embodiment of the invention.

An exemplary embodiment of an imaging apparatus 800 incorporating features discussed above is shown in FIG. 5. FIG. 5 depicts imaging apparatus 800 that can increase the depth of field in accordance with exemplary embodiments of the invention. Apparatus 800 includes a lens 310 for directing an image onto image sensing unit 350. Image sensing unit 350 may comprise an image sensor having a pixel array, wherein the image sensor is mounted to an adjusting mechanism (See FIG. 3B). Any type of solid state sensing array may be used. Analog-to-digital (A/D) converter 830 converts analog image signals from image sensing unit 350 into digital signals. Image processor 840 performs image correction processes on the digital signals, and can also perform the process described herein for increasing the depth of field as a set of processing apertures 870 with associated multiple image capture, image combining and sharpening. Image processor 840 may also perform other processes such as data correction for defective pixels, color interpolation, etc., in producing digital image data. Output format converter/compression unit 850 converts the digital image data into an appropriate file format for output or display to the user. Controller 355 controls the operations of the apparatus 800.

Figure 6:
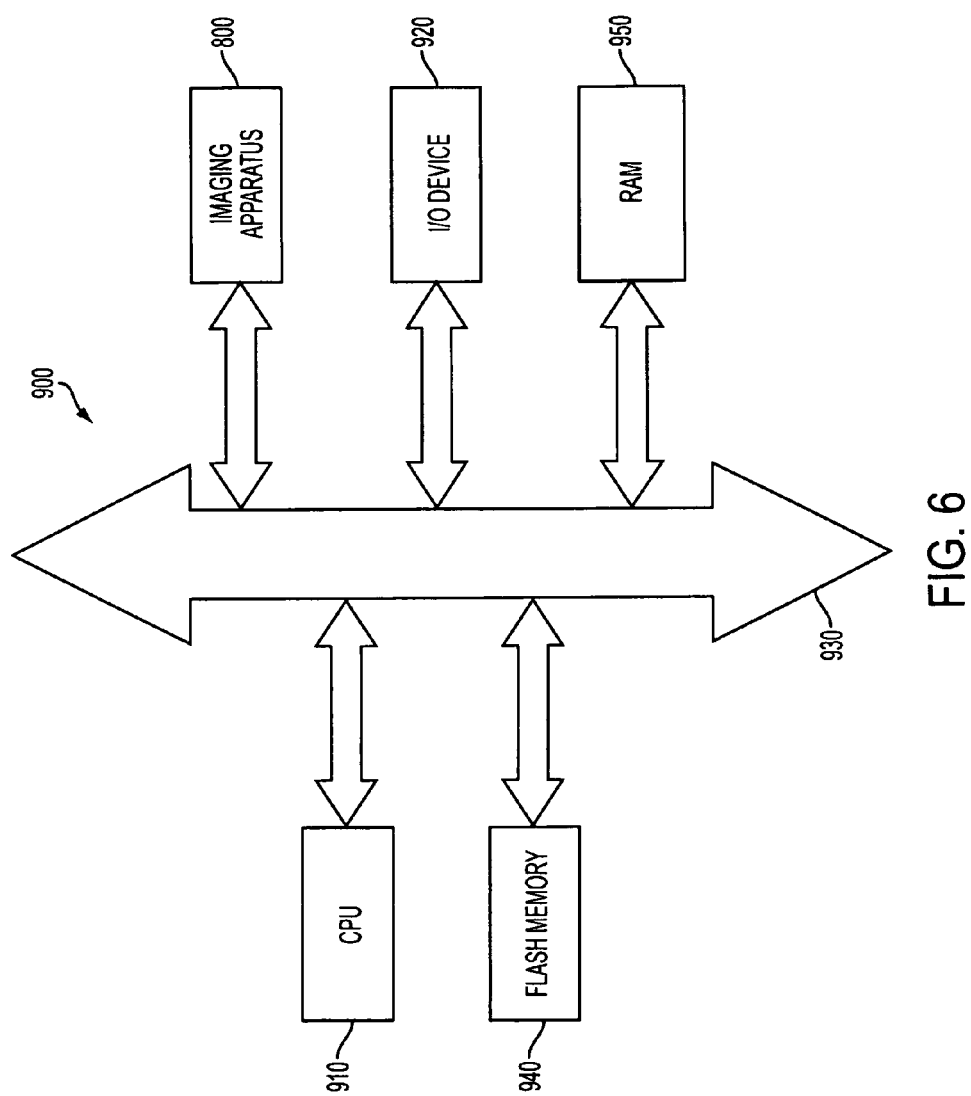
FIG. 6 is a schematic block diagram of a processing system that includes an imaging apparatus as in FIG. 5.

FIG. 6 shows of a simplified processor system 900, such as used, for example, in a digital camera system, which incorporates the imaging apparatus 800 shown in FIG. 5. System 900 includes a central processing unit (CPU) 910 that communicates with an input/output (I/O) device 920 over a bus 930. Apparatus 800 communicates with CPU 910 and other components of the system over bus 930 or a ported connection. System 900 also includes random access memory (RAM) 950 and may include peripheral devices such as a removable FLASH memory 940 which also communicates with CPU 910 over the bus 930. FLASH memory 940 may provide information storage in any type of imaging application, for example in digital cameras. Examples of FLASH memory 940 that may be used in the invention include, for example, removable solid-state storage devices such as memory cards. Although the simplified FIG. 6 processing system shows a single bus 930, this may in practice be formed as a plurality of busses and/or bridges linking the components.

Figure 7:
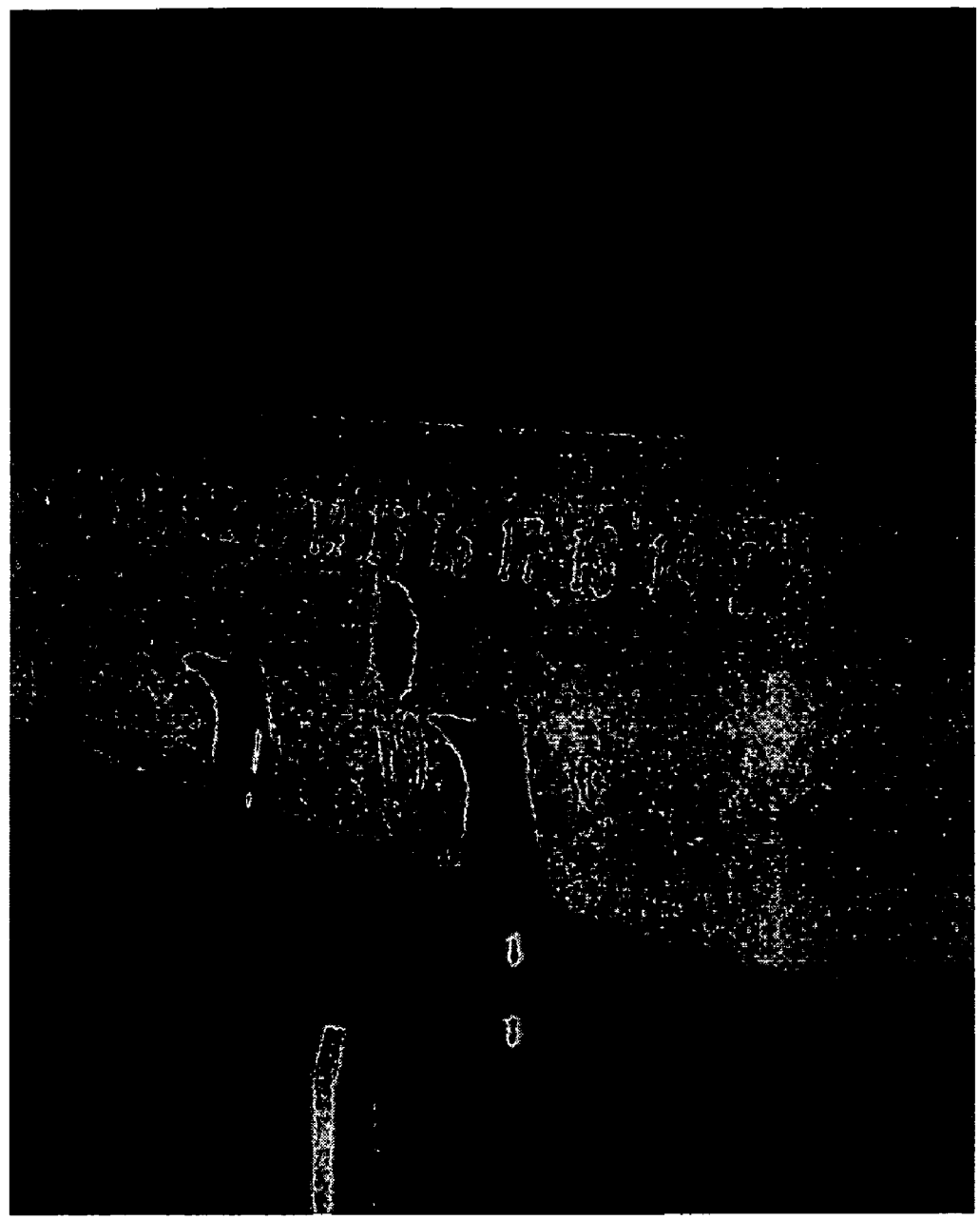
FIG. 7 illustrates a single, standard image of a ruler.
Figure 8:
FIG. 8 illustrates a final, summed and sharpened image of the ruler in accordance with an embodiment of the invention.

FIGS. 7 and 8 are photographs which illustrate an example of the increased depth of field which can be obtained using the invention. FIG. 7 is a single image of a ruler and shares the depth of field limits, while FIG. 8 is a sharpened, combined multiple image at different focus positions produced in accordance with the invention. As shown, the FIG. 8 ruler has a much wider depth of field compared to the FIG. 7 ruler. The manner in which FIGS. 7 and 8 were created is described below.

The ruler was set up with a tilt along an optical axis to display the depth of field. The lens was set up at a fixed position approximately 35 cm from the ruler. The imager was set up approximately 2 cm from the back of the lens. An initial image focusing at 15 cm was acquired as FIG. 7. Then, a total of thirteen (13) images were taken with the imager with the focus position moving from best focus −d through the best focus d, to best focus +d in equal steps. The imager moved a total of approximately 0.36 mm (360 µm). The final images were summed together in PaintShop Pro® software on a pixel-by-pixel basis. The original summed pixel values were first divided by 13 to maintain a final image exposure value on the same order of magnitude as the originals. Then, a commercial sharpening program was used to sharpen the final image to produce the FIG. 8 image.

Although exemplary embodiments of the invention are shown and described above, those skilled in the art will recognize that any type of image sensor having a pixel array may be used to capture the images, and that substitutions, additions, deletions, modifications and/or other changes may be made to the exemplary embodiments without departing from the spirit or scope of the invention.

The embodiments described may be integrated into the imager module itself or on a camera processor. Since the embodiments of the invention can be implemented in software, the feature of providing an increased depth of field can be toggled on or off for different situations, e.g., macro mode, portrait mode, etc.

The above description and drawings illustrate embodiments which achieve the objects of the present invention. Although certain advantages and embodiments have been described above, those skilled in the art will recognize that substitutions, additions, deletions, modifications and/or other changes may be made without departing from the spirit or

What is claimed as new and desired to be protected by Letters Patent of the United States is:

1. An imaging apparatus comprising:
   a lens having a field of view;
   an image sensor having a pixel array for receiving an optical image from said lens;
   a mechanism for changing a focus position in said field of view; and
   a control circuit for controlling said mechanism and sensor to capture a plurality of images at respective different focus positions, combining the plurality of images to form a single image, and sharpening the single image.

2. The imaging apparatus of claim 1, wherein said plurality of images is at least three images.

3. The imaging apparatus of claim 1, wherein said control circuit is operable to combine said captured images with equal weighting for each image.

4. The imaging apparatus of claim 1, wherein said control circuit is operable to combine said captured images with unequal weighting for each image.

5. The imaging apparatus of claim 1, wherein said adjusting mechanism moves a position of said sensor.

6. The imaging apparatus of claim 1, wherein said adjusting mechanism moves a position of said lens.

7. The imaging apparatus of claim 1, wherein said adjusting mechanism is a piezoelectric element.

8. An imaging apparatus comprising:
   a lens having a field of view;
   an image sensor having a pixel array for receiving an optical image from said lens;
   a mechanism for changing the focal positions within said field of view; and
   a control circuit for controlling said mechanism and sensor to change said focus position a plurality of times in response to initiation of an image capture operation, and to capture an image at each of said focus positions and combine said captured images, and for sharpening said combined captured images.

9. An imaging apparatus of claim 8, wherein said mechanism changes said focus positions by changing the relative position of said lens and sensor.

10. The image device of claim 9, wherein said at least one lens is a fixed position lens, and the position of said sensor is changed by said mechanism.

11. The imaging apparatus of claim 9, wherein said sensor is fixed, and the position of said lens is changed by said mechanism.

12. The imaging apparatus of claim 10, wherein said adjusting mechanism is a piezoelectric element.

13. The imaging apparatus of claim 10, wherein said adjustable mechanism is a mechanical system.

14. The imaging apparatus of claim 13, wherein said mechanical system is a servo controlled system.

15. The imaging apparatus of claim 11, wherein said adjusting mechanism is a piezoelectric element.

16. The imaging apparatus of claim 11, wherein said adjustable mechanism is a mechanical system.

17. The imaging apparatus of claim 16, wherein said mechanical system is a servo controlled system.

18. The imaging apparatus of claim 8, wherein said circuit captures at least three discrete images along an optical axis at best focus.

19. The imaging apparatus of claim 9, wherein said control circuit causes images to be captured in equal focus spacing along the optical axis with the spacing centered about an initial selected focus position.

20. The imaging apparatus of claim 9, wherein the images are combined with equal weighting for each image.

21. The imaging apparatus of claim 9, wherein the images are combined with unequal weighting for each image.

22. An imaging system comprising:
    an image acquisition system for capturing a plurality of images in a field of view at different focus positions, said different focus positions including an initial set focus position and focus positions in front of and behind said initial set focus position; and
    an image processor for combining said captured images into a single image and for sharpening said single image.

23. The system of claim 22, wherein said image acquisition system captures at least three discrete images and said image processor combines said at least three discrete captured images.

24. The system of claim 23, wherein said image acquisition system captures said at least three discrete images in equal focus spacing along the optical axis with the spacing centered about a user selected focus position.

25. The system of claim 23, wherein said image acquisition system captures said at least three discrete images in unequal focus spacing along the optical axis with the spacing centered about a user selected focus position.

26. The system of claim 23, wherein said image processor combines said images with equal weighting for each image.

27. The system of claim 23, wherein said image processor combines said images with unequal weighting for each image.

28. A method of forming an imaging apparatus comprising the steps of:
    forming a lens having a field of view;
    forming an image sensor having a pixel array for receiving an optical image from said lens;
    forming a mechanism for changing a focus position in said field of view; and
    forming a control circuit for controlling said mechanism and sensor to capture at least two images under different focus positions, combining the at least two images to form a combined image, and sharpening the combined image.

29. The method of claim 28, wherein said combining of the captured images comprises equal weighting for each image.

30. The method of claim 28, wherein said combining of the captured images comprises unequal weighting for each image.

31. A system comprising:
    an image acquisition system for capturing a plurality of images in a field of view while changing the focus positions in said field of view during said capture operation; and
    an image processor for combining the captured plurality of images to form a single image and for sharpening said single image.

32. The system of claim 31, wherein said focus positions change with a varying velocity during capture of each of said plurality of images.

33. The system of claim 31, wherein said focus positions change with a constant velocity during capture of each of said plurality of images.

* * * * *